United States Patent
Yoon et al.

(10) Patent No.: US 12,432,656 B2
(45) Date of Patent: Sep. 30, 2025

(54) ELECTRONIC DEVICE FOR PERFORMING SA QUERY IN WLAN SYSTEM AND OPERATING METHOD THEREOF

(71) Applicant: SAMSUNG ELECTRONICS CO., LTD., Suwon-si (KR)

(72) Inventors: Jaeho Yoon, Suwon-si (KR); Sanghyeok Sim, Suwon-si (KR); Junhak Lim, Suwon-si (KR); Hyeonu Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 408 days.

(21) Appl. No.: 17/983,966

(22) Filed: Nov. 9, 2022

(65) Prior Publication Data

US 2023/0128203 A1    Apr. 27, 2023

Related U.S. Application Data

(63) Continuation of application No. PCT/KR2022/013037, filed on Aug. 31, 2022.

(30) Foreign Application Priority Data

Oct. 21, 2021    (KR) .................. 10-2021-0140832

(51) Int. Cl.
*H04W 84/12*    (2009.01)
*H04W 52/02*    (2009.01)

(52) U.S. Cl.
CPC ........ *H04W 52/0216* (2013.01); *H04W 84/12* (2013.01)

(58) Field of Classification Search
CPC ............................. H04W 52/0216; H04L 12/28
(Continued)

(56) References Cited

U.S. PATENT DOCUMENTS 9,603,116 B2    3/2017  Seok
10,716,066 B2   7/2020  Huang et al.
(Continued)

FOREIGN PATENT DOCUMENTS

EP    2 907 344 B1    9/2018
KR    10-1652449 B1    8/2016
(Continued)

OTHER PUBLICATIONS

Communications dated Dec. 6, 2022, issued by the International Searching Authority in counterpart International Application No. PCT/KR2022/013037 (PCT/ISA/210 and PCT/ISA/237).

*Primary Examiner* — Dang T Ton
(74) *Attorney, Agent, or Firm* — Sughrue Mion, PLLC

(57) ABSTRACT

An electronic device includes a communication circuit configured to support a wireless local area network (LAN) communication method, and a processor configured to be operatively connected to the communication circuit where the processor is configured to establish communication with an external electronic device through the communication circuit, to acquire information related to an activation time point of the external electronic device, based on a management frame being received through the communication circuit, to identify an operating state of the external electronic device based on the information related to the activation time point of the external electronic device, and to transmit a request frame related to confirmation of a security state with the external electronic device based on the operating state of the external electronic device.

18 Claims, 11 Drawing Sheets

(58) Field of Classification Search
USPC .................................. 370/329, 401, 402, 403
See application file for complete search history.

(56) References Cited

U.S. PATENT DOCUMENTS

| | | |
|---|---|---|
| 10,880,856 B2 | 12/2020 | Bhanage et al. |
| 10,952,139 B2 | 3/2021 | Asterjadhi et al. |
| 10,979,183 B2 | 4/2021 | Wang et al. |
| 11,765,706 B2* | 9/2023 | Höhne .............. H04W 72/0453 455/509 |
| 2014/0105196 A1 | 4/2014 | Seok |
| 2014/0112229 A1 | 4/2014 | Merlin et al. |
| 2015/0282053 A1 | 10/2015 | Kneckt et al. |
| 2016/0157218 A1* | 6/2016 | Nam .................... H04B 7/0632 370/329 |
| 2016/0219512 A1 | 7/2016 | Asterjadhi et al. |
| 2016/0249383 A1 | 8/2016 | Kwon et al. |
| 2017/0006526 A1 | 1/2017 | Seok |
| 2017/0280388 A1 | 9/2017 | Asterjadhi et al. |
| 2021/0058862 A1 | 2/2021 | Choo et al. |
| 2021/0211889 A1 | 7/2021 | Buddhikot et al. |
| 2023/0099706 A1 | 3/2023 | Ham |

FOREIGN PATENT DOCUMENTS

| | | |
|---|---|---|
| KR | 10-2157661 B1 | 9/2020 |
| KR | 10-2020-0120598 A | 10/2020 |
| KR | 10-2167885 B1 | 10/2020 |

\* cited by examiner

ELECTRONIC DEVICE FOR PERFORMING SA QUERY IN WLAN SYSTEM AND OPERATING METHOD THEREOF

CROSS-REFERENCE TO RELATED APPLICATIONS

This application is a continuation of International Application No. PCT/KR2022/013037 designating the United States, filed on Aug. 31, 2022, in the Korean Intellectual Property Receiving Office and claiming priority to Korean Patent Application No. 10-2021-0140832, filed on Oct. 21, 2021, in the Korean Intellectual Property Office, the disclosures of all of which are incorporated by reference herein in their entireties.

BACKGROUND

Field

Various embodiments of the disclosure relate to an apparatus and a method for performing a security association (SA) query in a wireless local area network (WLAN) system.

Description of Related Art

A wireless local area network (WLAN) system may use a designated frequency band (e.g., about 2.4 GHz band, about 5 GHz band, or about 6 GHz band) so as to support wireless connection of various electronic devices such as a smartphone, a tablet personal computer (PC), and a notebook.

The WLAN system may be installed not only in a private space such as home, but also in a public space such as an airport, a train station, an office, or a department store.

A WLAN system may provide a security function related to a management frame. For example, the WLAN system may support a protected management frame (PMF) for management frame protection.

An electronic device (e.g., access point (AP)) in the WLAN and an external electronic device (e.g., station (STA)) may share key information (e.g., secret key) for secure communication based on the PMF. Upon receiving a management frame related to the external electronic device, the electronic device (e.g., AP) may perform a security association (SA) query regarding the external electronic device (e.g., STA) in order to confirm the validity of the management frame. For example, the electronic device (e.g., AP) may transmit a SA query request frame to confirm the validity of the management frame. Upon receiving the SA query request frame from the electronic device, the external electronic device (e.g., STA) may transmit a SA query response frame to the electronic device to inform that the SA state with the electronic device is normal. However, if the external electronic device is in a doze state, reception of the SA query request frame from the electronic device may be limited, and it may be impossible to transmit the SA query response frame to the electronic device.

The electronic device (e.g., AP) cannot recognize the operating state of the external electronic device (e.g., STA) and, if no SA query response frame corresponding to a SA query request frame is received for a designated time, the electronic device may determine that the SA state with the external electronic device is invalid. In this case, the electronic device (e.g., AP) may perform a function related to the management frame. For example, upon receiving an association request frame related to the external electronic device from an attacker, the electronic device (e.g., AP) may determine that the SA state with the external electronic device is invalid due to the external electronic device in a doze state. In this case, the electronic device (e.g., AP) may release communication with the external electronic device based on the association request frame received from the attacker, and may establish communication with the attacker.

SUMMARY

Various embodiments of the disclosure provide an apparatus and a method for performing a SA query based on the operating state of an external electronic device (e.g., STA) in an electronic device (e.g., AP) of a WLAN system.

According to various embodiments, an electronic device may include a communication circuit configured to support a wireless local area network (LAN) communication method and a processor configured to be operatively connected to the communication circuit, where the processor is configured to establish communication with an external electronic device through the communication circuit, acquire information related to an activation time point of the external electronic device from the external electronic device, based on a management frame being received through the communication circuit, identify an operating state of the external electronic device based on the information related to the activation time point of the external electronic device, and transmit a request frame related to confirmation of a security state with the external electronic device based on the operating state of the external electronic device.

The processor may be configured to acquire the information related to the activation time point of the external electronic device based on configuration of a target wakeup time (TWT) session.

The processor may be configured to confirm identification information included in the management frame received through the communication circuit, identify whether the management frame is related to the external electronic device based on the identification information, and identify the operating state of the external electronic device based on the management frame being related to the external electronic device.

The management frame may be an association request frame, and the processor may be configured to configure time information related to retransmission of the association request frame based on the activation time point of the external electronic device, and transmit an association response frame including the time information related to the retransmission of the association request frame through the communication circuit.

Based on the external electronic device being determined to be in a doze state, the processor may be configured to limit transmission of the request frame related to the confirmation of the security state with the external electronic device, and based on the external electronic device being determined to be in a wakeup state, the processor may be configured to transmit the request frame related to the confirmation of the security state with the external electronic device.

Based on a response frame corresponding to the request frame related to the confirmation of the security state being received from the external electronic device, the processor may be configured to discard the management frame.

Based on the response frame corresponding to the request frame related to the confirmation of the security state not being received from the external electronic device, the processor may be configured to periodically transmit the request frame related to the confirmation of the security state with the external electronic device for a designated time.

Based on the response frame corresponding to the request frame related to the confirmation of the security state not being received from the external electronic device for the designated time, the processor may be configured to perform a function corresponding to the management frame.

The processor may be configured to obtain a transmission time point of the request frame based on the information related to the activation time point of the external electronic device and transmit the request frame based on the obtained transmission time point.

The management frame may be a dissociation association request frame received from an external device different from the external electronic device, and based on the dissociation association request frame being received from the external device, the processor may be configured to obtain a transmission time point of the request frame based on the information related to the activation time point of the external electronic device and transmit the request frame based on the obtained transmission time point.

According to various embodiments, a method of operating an electronic device may include establishing communication with an external electronic device based on wireless local area network (LAN) communication, acquiring information related to an activation time point of the external electronic device from the external electronic device, based on a management frame being received, identifying an operating state of the external electronic device based on information related to the activation time point of the external electronic device, and transmitting a request frame related to confirmation of a security state with the external electronic device based on the operating state of the external electronic device.

The acquiring of the information related to the activation time point of the external electronic device may include acquiring the information related to the activation time point of the external electronic device based on configuration of a target wakeup time (TWT) session.

The identifying of the operating state of the external electronic device may include confirming identification information included in the management frame, identifying whether the management frame is related to the external electronic device based on the identification information, and identifying the operating state of the external electronic device based on the management frame being related to the external electronic device.

The management frame may be an association request frame received from an external device different from the external electronic device and the method may further include configuring time information related to retransmission of the association request frame based on the activation time point of the external electronic device and transmitting an association response frame including the time information related to the retransmission of the association request frame.

The transmitting of the request frame may include transmitting, based on the external electronic device being determined to be in a wakeup state, the request frame related to the confirmation of the security state with the external electronic device, and the method may further include limiting, based on the external electronic device being determined to be in a doze state, transmission of the request frame related to the confirmation of the security state with the external electronic device.

The method may further include discarding, based on a response frame corresponding to the request frame related to the confirmation of the security state being received from the external electronic device, the management frame, and periodically transmitting, based on the response frame corresponding to the request frame related to the confirmation of the security state not being received from the external electronic device, the request frame related to the confirmation of the security state with the external electronic device for a designated time.

The method may further include, based on the response frame corresponding to the request frame related to the confirmation of the security state not being received from the external electronic device, periodically transmitting the request frame related to the confirmation of the security state with the external electronic device for a designated time.

The method may further include performing, based on the response frame corresponding to the request frame related to the confirmation of the security state not being received from the external electronic device for the designated time, a function corresponding to the management frame.

The management frame may be a dissociation association request frame received from an external device different from the external electronic device, and the method may further include, based on the dissociation association request frame being received from the external device, obtaining a transmission time point of the request frame based on the information related to the activation time point of the external electronic device, and the transmitting of the request frame may include transmitting the request frame based on the obtained transmission time point.

According to various embodiments, there is provides a non-transitory computer-readable storage medium having recorded thereon a program for executing the method of operating the electronic device.

According to various embodiments of the disclosure, based on an activation time point of an external electronic device (e.g., station (STA)) acquired through a target wakeup time (TWT) by an electronic device (e.g., access point (AP)) of a WLAN system, a security association (SA) query regarding the external electronic device (e.g., STA) is performed, thereby preventing unnecessary release of communication connection with the external electronic device.

DETAILED DESCRIPTION

Hereinafter, various embodiments will be described in detail with reference to attached drawings.

Figure 1:
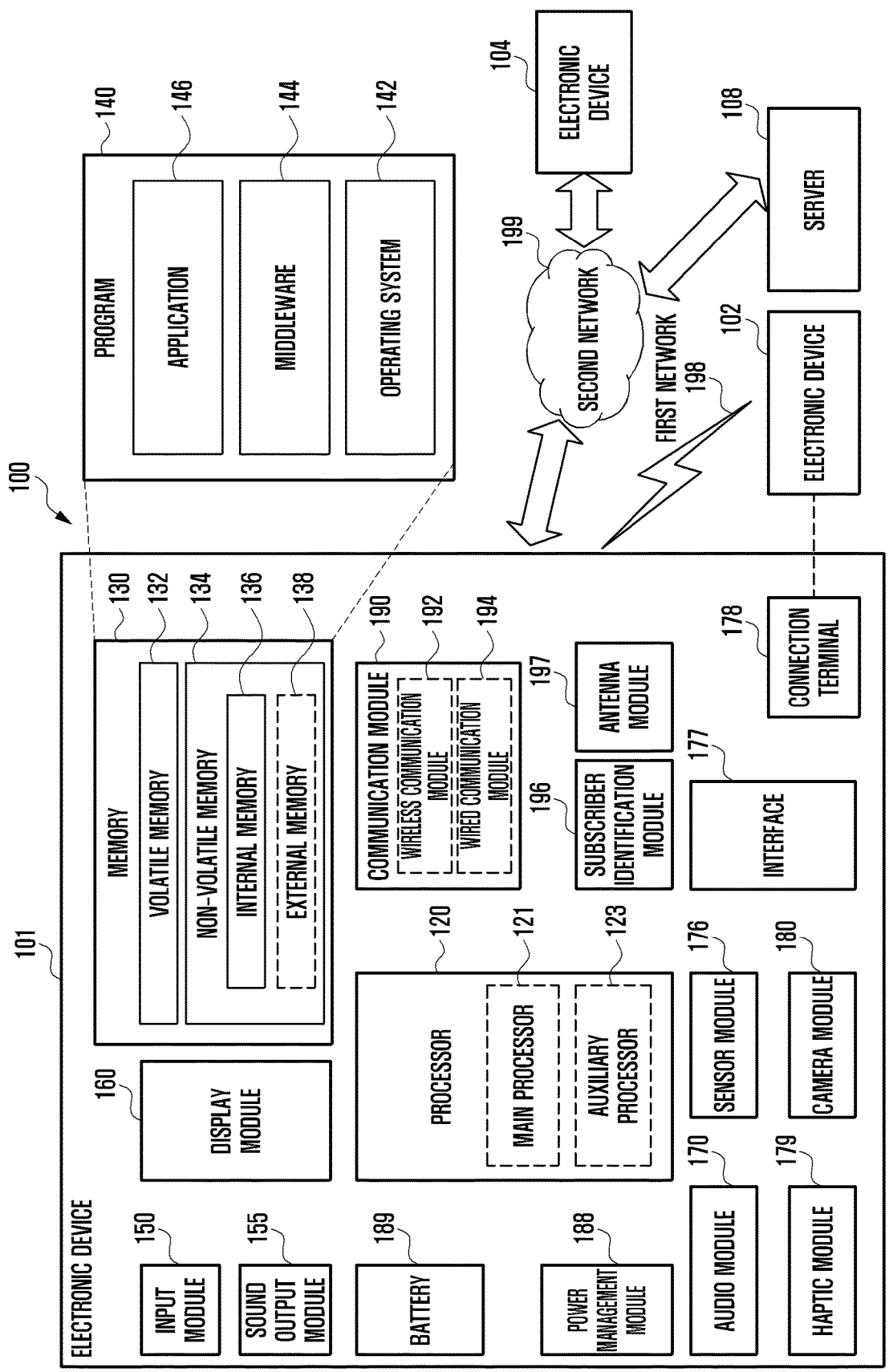
FIG. 1 is a block diagram illustrating an electronic device according to various embodiments of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, a memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the external electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. The subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, an electronic device 101 of a wireless LAN system may transmit and/or receive a management frame, a control frame, and/or a data frame to/from an external electronic device through wireless LAN communication. According to an embodiment, the electronic device 101 may serve as a base station that provides wireless communication to at least one external electronic device located within a service radius related to wireless LAN communication. For example, the electronic device 101 may include a transmission node or an access point (AP). According to an embodiment, the management frame may include at least one frame related to establishment of communication (e.g., establishment of initial communication) between the electronic device 101 and an external electronic device based on wireless LAN communication. According to an embodiment, the control frame may include at least one frame related to control of transmission and/or reception of a data frame in a state in which the electronic device 101 and the external electronic device are connected to each other in a manner of wireless LAN communication. According to an embodiment, the data frame may include information to be transmitted and/or received by the electronic device 101 and the external electronic device through wireless LAN communication. For example, the frame may indicate a basic form of a signal and/or data transmitted and/or received between the electronic device 101 and an external electronic device in a wireless LAN system.

Figure 2:
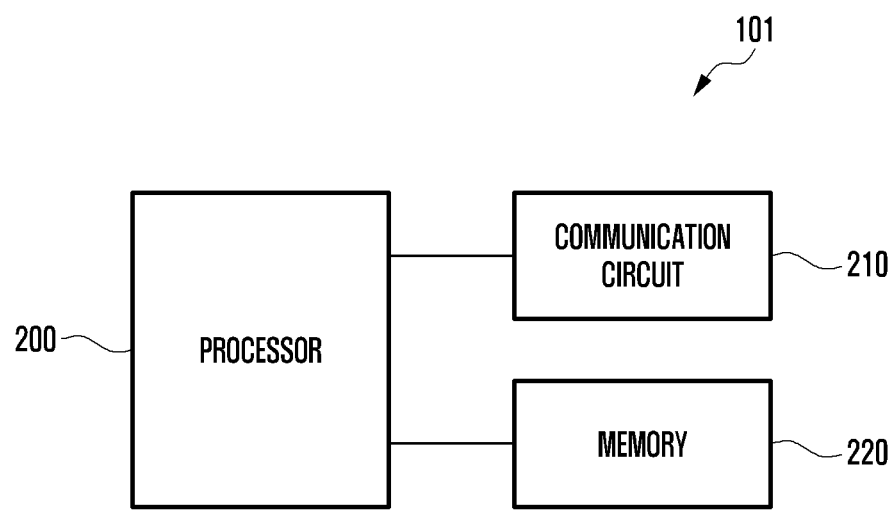
FIG. 2 is a block diagram illustrating an electronic device of a wireless LAN system according to various embodiments of the disclosure.

FIG. 2 is a block diagram illustrating an electronic device of a wireless LAN system according to various embodiments of the disclosure.

According to various embodiments with reference to FIG. 2, the electronic device 101 may include a processor 200, a communication circuit 210, and a memory 220. According to an embodiment, the processor 200 may be substantially the same as the processor 120 of FIG. 1 or may include the processor 120. The communication circuit 210 may be substantially the same as the wireless communication module 192 of FIG. 1 or may include the wireless communication module 192. The memory 220 may be substantially the same as the memory 130 of FIG. 1 or may include the memory 130. According to an embodiment, the processor 200 may be operatively connected to the communication circuit 210 and/or the memory 220.

According to various embodiments, the processor 200 (e.g., a communication processor (CP)) may control the communication circuit 210 to connect communication with an external electronic device (e.g., a station (STA)) based on wireless LAN communication. According to an embodiment, the processor 200 may control the communication circuit 210 to periodically transmit a beacon frame so that the external electronic device can search for the electronic device 101. According to an embodiment, when receiving a probe request frame through the communication circuit 210, the processor 200 may control the communication circuit 210 to transmit a probe response frame to the external electronic device based on identification information included in the probe request frame. For example, when the identification information included in the probe request frame corresponds to or coincides with the beacon frame of the electronic device 101, the processor 200 may determine that the probe response frame is transmitted. For example, the identification information included in the probe request frame may include a service set identifier (SSID) or a basic service set identifier (BSSID).

According to an embodiment, the processor 200 may perform an authentication procedure with the external electronic device. For example, when receiving an authentication request frame from the external electronic device through the communication circuit 210, the processor 200 may perform authentication for the external electronic device based on information included in the authentication request frame. When authentication of the external electronic device is completed or successful, the processor 200 may control the communication circuit 210 to transmit an authentication response frame to the external electronic device. For example, the information included in the authentication request frame may include information related to an authentication algorithm, an authentication transaction sequence number, a status code, or a challenge text.

According to an embodiment, the processor 200 may establish wireless LAN communication with the external electronic device for which authentication has been completed or succeeded. For example, when receiving an association request frame from the external electronic device through the communication circuit 210, the processor 200 may control the communication circuit 210 to transmit an association response frame to the external electronic device in response to the association request frame. For example, the external electronic device may be associated with a wireless LAN network through the electronic device 101 based on the association request frame and the association response frame.

According to various embodiments, the processor 200 may acquire information related to an activation time point of the external electronic device from the external electronic device which is connected to the electronic device 101 in a manner of wireless LAN communication. According to an embodiment, the processor 200 may acquire the information related to the activation time point of the external electronic device based on a target wakeup time (TWT) session configuration with the external electronic device. According to an embodiment, the processor 200 may acquire the information related to the activation time point of the external electronic device through an individual TWT procedure. For example, the processor 200 may acquire the information related to the activation time point required by the external electronic device included in a request frame received from the external electronic device through the communication circuit 210. For example, the request frame may include an association request frame or a request frame separate from the association request frame. For example, the separate request frame may be received from the external electronic device before or after wireless LAN communication between the electronic device 101 and the external electronic device is established. For example, the information related to the activation time point may include information related to a section in which the external electronic device operates in an active state (e.g., a wakeup state) or a section in which the external electronic device operates in a doze state. For example, the activation time point of the external electronic device may include information related to a time point when a function related to wireless LAN communication of the external electronic device is switched from the doze state to the wakeup state.

According to an embodiment, the processor 200 may acquire the information related to the activation time point of the external electronic device through a broadcast TWT procedure. For example, the processor 200 may configure information related to a target beacon frame and the information related to the activation time point of the external electronic device. The processor 200 may control the communication circuit 210 to transmit the information related to the target beacon frame and the information related to the activation time point of the external electronic device to the communicably connected external electronic device. For example, the information related to the target beacon frame and the information related to the activation time point of the external electronic device may be transmitted to the external electronic device through a response frame corresponding to the request frame received from the external electronic device. For example, the information related to the target beacon frame and the information related to the activation time point of the external electronic device may be transmitted to the external electronic device through a response frame regardless of the request frame received from the external electronic device. For example, the information related to the target beacon frame may include information related to a time point at which the electronic device 101 transmits the target beacon frame or information related to a period at which the target beacon frame is transmitted.

According to various embodiments, when receiving a management frame related to the external electronic device through the communication circuit 210, the processor 200 may control the communication circuit 210 to perform an SA query based on the activation time point of the external electronic device. According to an embodiment, when the management frame is received through the communication circuit 210, the processor 200 may confirm identification information of an entity that has transmitted the management frame. The processor 200 may identify whether the management frame is related to the external electronic device which is communicably connected to the electronic device 101 based on the identification information of the entity that has transmitted the management frame. For example, when the identification information of the transmission entity identified in the management frame corresponds to or coincides with the identification information of the external electronic device, the processor 200 may determine that the management frame related to the external electronic device has been received. As an example, the identification information of the transmission entity that has transmitted the management frame may include a media access control (MAC) address. For example, the management frame may include a beacon frame, a probe request frame, an association request frame, a reassociation request frame, a channel switching announcement (CSA) frame, a deauthentication frame, an announcement traffic indication message (ATIM), and/or a disassociation frame. For example, the deauthentication frame or the disassociation frame may include a frame in an unprotected state.

According to an embodiment, when receiving the management frame (e.g., the association request frame) related to the external electronic device, the processor 200 may control the communication circuit 210 to transmit a response frame (or rejection frame) including a retransmission time point of the management frame. For example, the retransmission time point of the management frame may be configured based on the activation time point of the external electronic device. For example, the retransmission time point of the management frame may be configured to be longer than the time remains until the activation time point of the external electronic device.

According to an embodiment, when receiving the management frame related to the external electronic device, the processor 200 may identify the operating state of the external electronic device based on the information related to the activation time point of the external electronic device. For example, when the processor 200 determines that the external electronic device is in the doze state, the external electronic device may limit transmission of an SA query request frame until the activation time point. For example, when it is determined that the external electronic device is in the wakeup state or when the activation time point of the external electronic device arrives, the processor 200 may control the communication circuit 210 to transmit the SA query request frame related to the external electronic device in order to identify the validity of the management frame related to the external electronic device. For example, the doze state is a state in which the external electronic device operates in a low power state, and may include a state in which the use of a network for wireless LAN communication of the external electronic device is restricted.

According to an embodiment, when the SA query response frame is not received, the processor 200 may control the communication circuit 210 to periodically transmit an SA query request signal for a designated first time. For example, when an SA query response frame is not received until a designated second time elapses starting from a time point when the SA query request frame has been transmitted, the processor 200 may control the communication circuit 210 to retransmit the SA query request frame. For example, the designated first time may indicate a maximum time period configured to identify an SA state with the external electronic device based on the SA query. For example, the designated second time is a time period for determining whether to retransmit the SA query request frame, and may be configured shorter than the designated first time.

According to various embodiments, the processor 200 may determine a security association (SA) state with the external electronic device based on whether the SA query response frame corresponding to the SA query request frame is received. According to an embodiment, when the SA query response frame is not received for the designated first time, the processor 200 may determine that the SA state with the external electronic device is invalid. When it is determined that the SA state with the external electronic device is invalid, the processor 200 may perform a function corresponding to the management frame related to the external electronic device. For example, when receiving the association request frame related to the external electronic device, the processor 200 may control the communication circuit 210 to transmit the association response frame corresponding to the association request frame. For example, when receiving the disassociation frame related to the external electronic device, the processor 200 may perform a series of procedures for releasing the communication establishment with the external electronic device based on the disassociation frame.

According to an embodiment, when receiving the SA query response frame, the processor 200 may determine that the SA state with the external electronic device is valid. When it is determined that the SA state with the external electronic device is valid, the processor 200 may determine that the management frame related to the external electronic device has been transmitted by an attacker. The processor 200 may discard (or ignore) the management frame determined to be transmitted by the attacker.

According to various embodiments, the communication circuit 210 may support communication between the electronic device 101 and the external electronic device based on the wireless LAN. According to an embodiment, the communication circuit 210 may include a radio frequency integrated circuit (RFIC) and a radio frequency front end (RFFE) for wireless LAN communication with the external electronic device.

According to various embodiments, the memory 220 may store a variety of data used by at least one component of the electronic device 101 (e.g., the processor 200 or the communication circuit 210). According to an embodiment, the memory 210 may store various instructions that may be executed through the processor 200.

Figure 3:
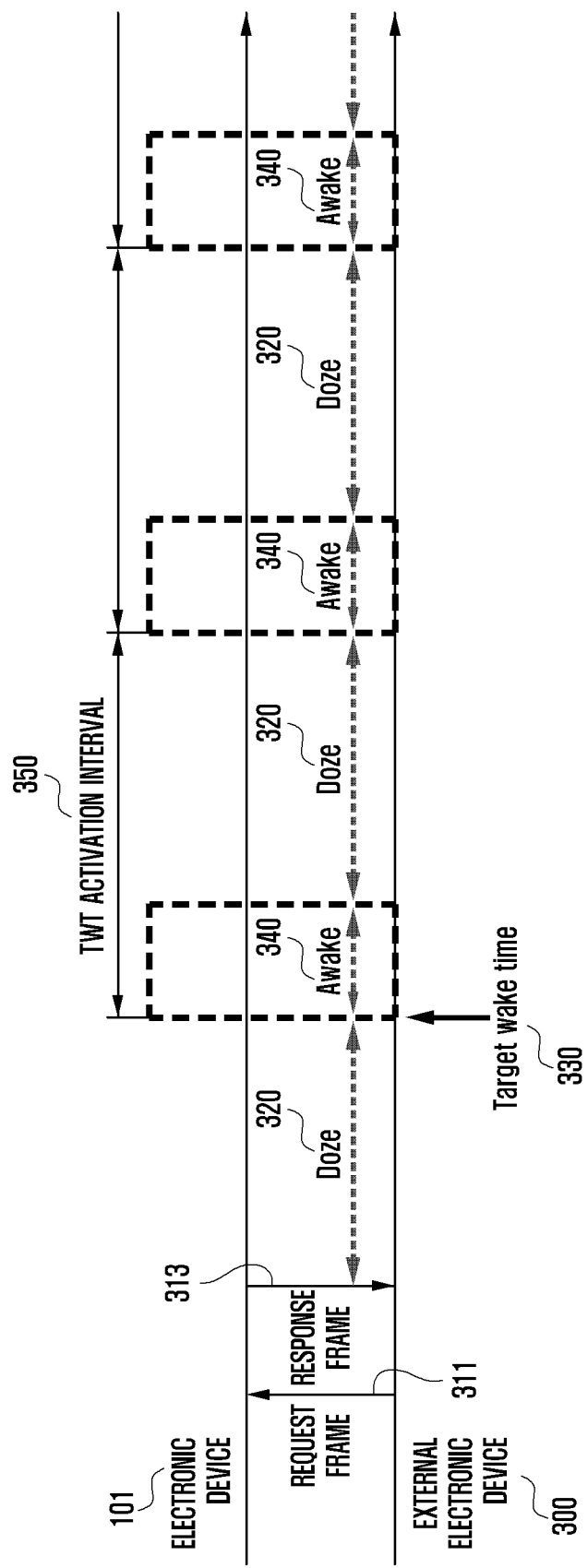
FIG. 3 illustrates an example in which information related to an activation time point of an external electronic device is acquired based on an individual TWT in an electronic device according to various embodiments of the disclosure.

FIG. 3 illustrates an example in which information related to an activation time point of an external electronic device is acquired based on an individual TWT in an electronic device according to various embodiments of the disclosure.

According to various embodiments with reference to FIG. 3, the external electronic device 300 may support a TWT function to reduce power consumption by wireless LAN communication. For example, the TWT function may include a function for supporting wireless LAN communication between the electronic device 101 and an external electronic device 300 only during an active period configured through negotiation between the electronic device 101 and the external electronic device 300. The external electronic device 300 may restrict or deactivate wireless LAN communication in a section (e.g., a dose section) other than the active section.

According to various embodiments, when the TWT function is activated, the external electronic device 300 may transmit a request frame related to the configuration of the TWT function to the electronic device 101 in order to configure a TWT session in operation 311. According to an embodiment, when wireless LAN communication are connected to the electronic device 101, the external electronic device 300 may transmit the request frame related to the configuration of the TWT function to the electronic device 101 in operation 311. For example, the request frame related to configuration of the TWT function may include information related to the activation time point required by the external electronic device 300. For example, the information related to the activation time point may include information related to a section (e.g., an active section) in which the external electronic device 300 maintains a wakeup state and/or a section (e.g., a doze section) in which the external electronic device 300 operates in a doze state. For example, the request frame related to the configuration of the TWT function may include an association request frame or a request frame separate from the association request frame.

According to various embodiments, the electronic device 101 may transmit a response frame related to the configuration of the TWT function to the external electronic device 300 in response to the request frame related to the configuration of the TWT function in operation 313. For example, the response frame related to the configuration of the TWT function may include information related to the activation time point of the external electronic device 300 for the TWT function. For example, the information related to the activation time point of the external electronic device 300 may include acceptance information corresponding to the information related to the activation time point required by the external electronic device 300 or update information of the information related to the activation time point required by the external electronic device 300. For example, the response frame related to the configuration of the TWT function may include an association response frame or a response frame separate from the association response frame.

According to various embodiments, the external electronic device 300 may perform the TWT function based on the information related to the activation time point identified in the response frame related to the configuration of the TWT function. According to an embodiment, the external electronic device 300 may operate in a doze state 320 until an activation time point 330 arrives. When the activation time point 330 arrives, the external electronic device 300 may be switched to a wakeup state 340 to perform wireless LAN communication with the electronic device 101. For example, the external electronic device 300 may periodically operate in the doze state or the wakeup state based on the information related to the active time point identified in the response frame related to the configuration of the TWT function. For example, the external electronic device 300 may periodically operate in the doze state or the wakeup state based on a TWT activation interval 350. For example, the external electronic device 300 may aperiodically operate in the doze state or the wakeup state based on the information related to the activation time point confirmed in the response frame related to the configuration of the TWT function.

According to various embodiments of the disclosure, the electronic device 101 may transmit the request frame related to the configuration of the TWT function to the external electronic device 300 in order to configure the TWT session with the external electronic device 300. For example, the request frame related to the configuration of the TWT function may be transmitted to the external electronic device 300 based on the connection of wireless LAN communication with the external electronic device 300. According to an embodiment, the external electronic device 300 may transmit a response frame related to the configuration of the TWT function to the electronic device 101 in response to the request frame related to the configuration of the TWT function. For example, the response frame related to the configuration of the TWT function may include information related to an activation time point of the external electronic device 300 for the TWT function.

Figure 4:
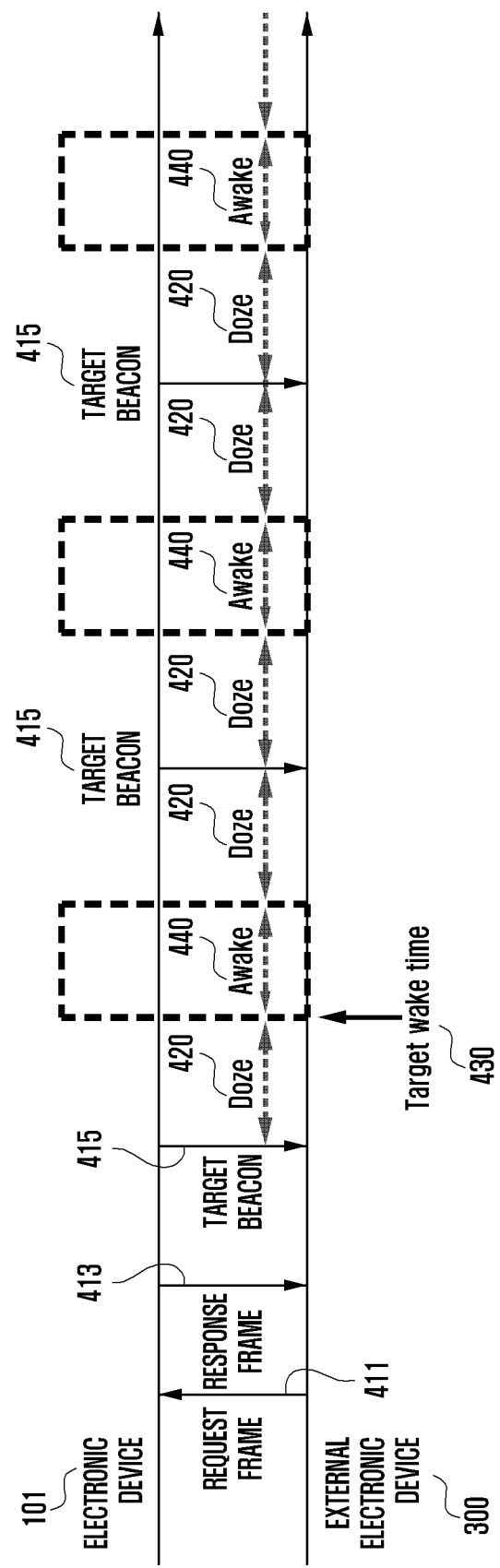
FIG. 4 illustrates an example in which information related to an activation time point of an external electronic device is acquired based on a broadcast TWT in an electronic device according to various embodiments of the disclosure.

FIG. 4 illustrates an example in which information related to an activation time point of an external electronic device is acquired based on a broadcast TWT in an electronic device according to various embodiments of the disclosure.

According to various embodiments with reference to FIG. 4, when a TWT function is activated, the external electronic device 300 may transmit a request frame related to the configuration of the TWT function to the electronic device 101 in order to configure a TWT session in operation 411. For example, the request frame related to the configuration of the TWT function may be transmitted in a state in which the external electronic device 300 is connected to the electronic device 101 in a manner of wireless LAN communication. For example, the request frame related to the configuration of the TWT function may include information related to an activation time point required by the external electronic device and/or information requesting configuration of the activation time point of the external electronic device.

According to various embodiments, the electronic device 101 may transmit a response frame related to the configuration of the TWT function to the external electronic device 300 in response to the request frame related to the configuration of the TWT function in operation 413. For example, the response frame related to the configuration of the TWT function may include information related to a target beacon frame and information related to the activation time point of the external electronic device 300. For example, the information related to the target beacon frame may include information related to a transmission period of the target beacon frame or a transmission time point of the target beacon frame.

According to various embodiments, the external electronic device 300 may receive the target beacon frame based on the information related to the target beacon frame identified in the response frame related to the configuration of the TWT function. According to an embodiment, the external electronic device 300 may operate in a doze state until the transmission time point of the target beacon frame arrives. When the transmission time point of the target beacon frame arrives, the external electronic device 300 may be switched to a wakeup state to receive the target beacon frame in operation 415.

According to various embodiments, when receiving the target beacon frame, the external electronic device 300 may perform the TWT function based on the information related to the activation time point of the external electronic device 300 identified in the response frame related to the configuration of the TWT function. According to an embodiment, the external electronic device 300 may operate in a doze state 420 until an activation time point 430 arrives. When the activation time point 430 arrives, the external electronic device 300 may be switched to a wakeup state 440 to perform wireless LAN communication with the electronic device 101. According to an embodiment, the external electronic device 300 may periodically operate in the doze state or the wakeup state based on the target beacon frame that is periodically received based on information related to the transmission of the target beacon frame.

According to various embodiments, the electronic device 101 may transmit, to the external electronic device 300, the response frame related to the configuration of the TWT function including the information related to the target beacon frame and the information related to the activation time point of the external electronic device regardless of the reception of the request frame related to the configuration of the TWT function.

According to various embodiments of the disclosure, an electronic device (e.g., the electronic device 101 of FIG. 1 or FIG. 2) may include a communication circuit (e.g., the wireless communication module 192 of FIG. 1 or the communication circuit 210 of FIG. 2) configured to support a wireless LAN communication method, and a processor (e.g., the processor 120 of FIG. 1 or the processor 200 of FIG. 2) configured to be operatively connected to the communication circuit. The processor may be configured to establish communication with an external electronic device through the communication circuit, to acquire information related to an activation time point of the external electronic device from the external electronic device, to identify an operating state of the external electronic device based on the information related to the activation time point of the external electronic device when a management frame is received through the communication circuit, and to transmit a request frame related to confirmation of a security state with the external electronic device based on the operating state of the external electronic device.

Figure 5:
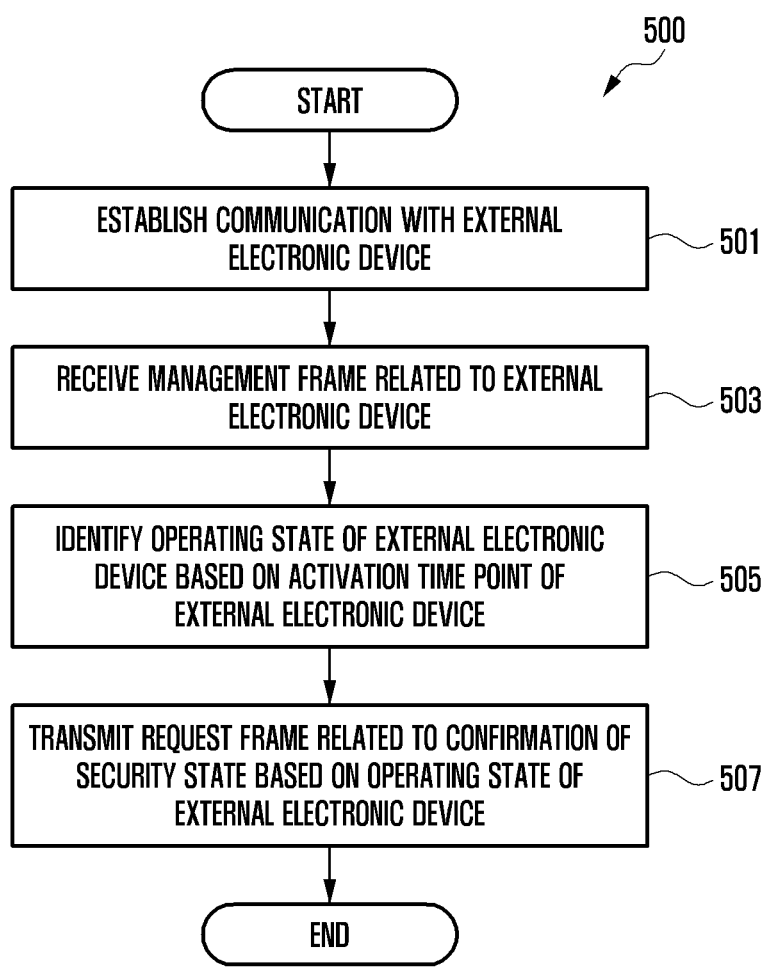
FIG. 5 is a flowchart illustrating a method for performing an SA query based on an activation time point of an external electronic device in an electronic device according to various embodiments of the disclosure.

FIG. 5 is a flowchart 500 illustrating a method for performing an SA query based on an activation time point of an external electronic device in an electronic device according to various embodiments of the disclosure. In the following embodiment, respective operations may be sequentially performed, but are not necessarily performed sequentially. For example, the order of the respective operations may be changed, and at least two operations may be performed in parallel. According to an embodiment, the electronic device for performing the method of FIG. 5 may be the electronic device 101 of FIG. 1 or FIG. 2.

According to various embodiments with reference to FIG. 5, in operation 501, an electronic device (e.g., the processor 120 or the wireless communication module 192 of FIG. 1 or the processor 200 or the communication circuit 210 of FIG. 2) may establish wireless LAN communication with an external electronic device. According to an embodiment, the processor 200 may receive an association request frame from the external electronic device that has completed an authentication procedure with the electronic device 101 through the communication circuit 210. The processor 200 may transmit an association response frame corresponding to the association request frame to the external electronic device through the communication circuit 210, thereby connecting the wireless LAN communication with the external electronic device.

According to various embodiments, in operation 503, the electronic device (e.g., the processor 120 or 200, the wireless communication module 192, or the communication circuit 210) may receive a management frame related to the external electronic device. For example, the management frame related to the external electronic device may include a management frame including the same identification information (e.g., an MAC address) as the identification information of the external electronic device. For example, the management frame may include a beacon frame, a probe request frame, an association request frame, a reassociation request frame, a channel switching announcement (CSA) frame, a deauthentication frame, an announcement traffic indication message (ATIM), or a disassociation frame.

According to various embodiments, in operation 505, the electronic device (e.g., the processor 120 or 200, the wireless communication module 192, or the communication circuit 210) may identify an operating state of the external electronic device based on information related to an activation time point of the external electronic device. According to an embodiment, the information related to the activation time point of the external electronic device may be acquired through configuration of a TWT session with the external electronic device. For example, the information related to the activation time point of the external electronic device may be acquired through an individual TWT procedure with the external electronic device as shown in FIG. 3. For example, the activation time point of the external electronic device may be acquired through a broadcast TWT procedure with the external electronic device as shown in FIG. 4.

According to various embodiments, in operation 507, the electronic device (e.g., the processor 120 or 200, the wireless communication module 192, or the communication circuit 210) may transmit a request frame related to confirmation of a security state with the external electronic device based on the operating state of the external electronic device. According to an embodiment, when the external electronic device is determined to be in a doze state, the processor 200 may limit transmission of the request frame related to the confirmation of the security state until the activation time point. According to an embodiment, when the external electronic device is determined to be in a wakeup state, the processor 200 may control the communication circuit 210 to transmit the request frame related to the confirmation of the security state with the external electronic device to the external electronic device. For example, the request frame related to the confirmation of the security state may include an SA query request frame.

According to various embodiments, when a response frame for the request frame (e.g., an SA query request frame) related to the confirmation of the security state is not received, the electronic device 101 may repeatedly transmit the request frame related to the confirmation of the security state to the external electronic device for a designated first time. According to an embodiment, when the response frame is not received until a designated second time elapses starting from a time point when the request frame related to the confirmation of the security state has been transmitted, the electronic device 101 may retransmit the request frame related to the confirmation of the security state to the external electronic device. For example, the designated first time may indicate a maximum time period for identifying an SA state with the external electronic device based on the SA query. For example, the designated second time is a time period for determining whether to retransmit the request frame related to the confirmation of the security state and may be configured as a time period shorter than the designated first time.

Figure 6:
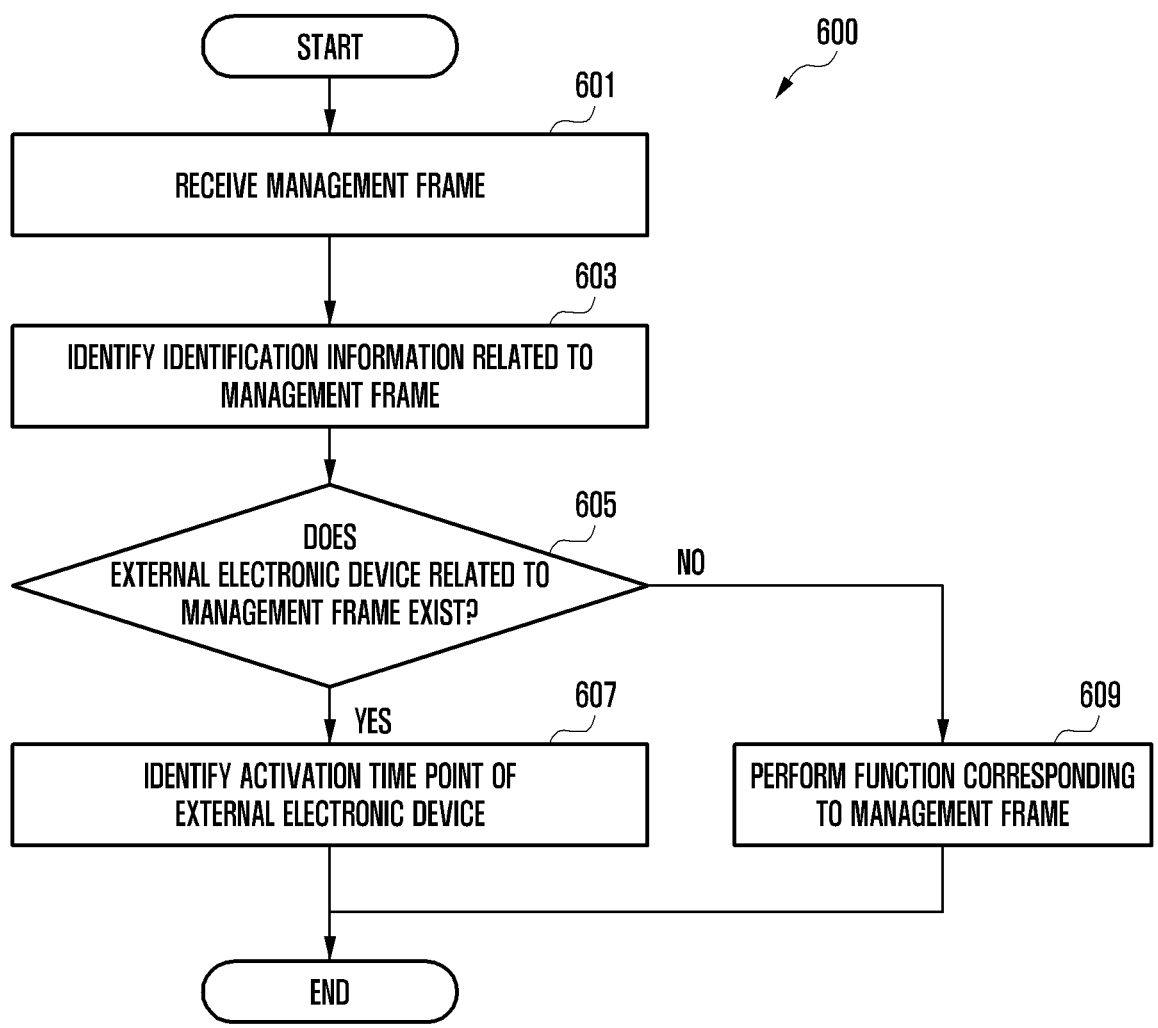
FIG. 6 is a flowchart illustrating a method for confirming an activation time point of an external electronic device in an electronic device according to various embodiments of the disclosure.

FIG. 6 is a flowchart 600 illustrating a method for confirming an activation time point of an external electronic device in an electronic device according to various embodiments of the disclosure. According to an embodiment, at least some of operations of FIG. 6 may be detailed operations of operations 503 and 505 of FIG. 5. In the following embodiment, respective operations may be sequentially performed, but are not necessarily performed sequentially. For example, the order of the respective operations may be changed, and at least two of the operations may be performed in parallel. According to an embodiment, the electronic device for performing the method of FIG. 6 may be the electronic device 101 of FIG. 1 or 2.

According to various embodiments with reference to FIG. 6, in operation 601, an electronic device (e.g., the processor 120 or the wireless communication module 192 of FIG. 1 or the processor 200 or the communication circuit 210 of FIG. 2) may receive a management frame through a wireless LAN network.

According to various embodiments, in operation 603, the electronic device (e.g., the processor 120 or 200, the wireless communication module 192, or the communication circuit 210) may identify identification information related to the management frame. According to an embodiment, the identification information related to the management frame is identification information of a transmission entity that has transmitted the management frame, and may include an MAC address of the transmission entity.

According to various embodiments, in operation 605, the electronic device (e.g., the processor 120 or 200, the wireless communication module 192, or the communication circuit 210) may identify whether there is the external electronic device related to the management frame among the external electronic devices communicably connected to the electronic device based on the identification information related to the management frame. According to an embodiment, the processor 200 may identify whether there is the external electronic device including the same identification information as the identification information related to the management frame among the external electronic devices communicably connected to the electronic device 101.

According to various embodiments, in operation 607, when there is the external electronic device related to the management frame (e.g., "YES" in operation 605), the electronic device (e.g., the processor 120 or 200, the wireless communication module 192, or the communication circuit 210) may identify the information related to an activation time point of the external electronic device related to the management frame. According to an embodiment, the processor 200 may identify the information related to the activation time point of the external electronic device acquired through configuration of a TWT session with the external electronic device. For example, the information related to the activation time point of the external electronic device may include information related to a time point when the external electronic device is switched from a doze state to a wakeup state.

According to various embodiments, in operation 609, when there is not the external electronic device related to the management frame (e.g., "NO" in operation 605), the electronic device (e.g., the processor 120 or 200, the wireless communication module 192, or the communication circuit 210) may perform a function corresponding to the management frame. According to an embodiment, when an association request frame is received through the communication circuit 210, the processor 200 may perform a series of procedures for establishing communication with the external electronic device that has transmitted the association request frame.

Figure 7:
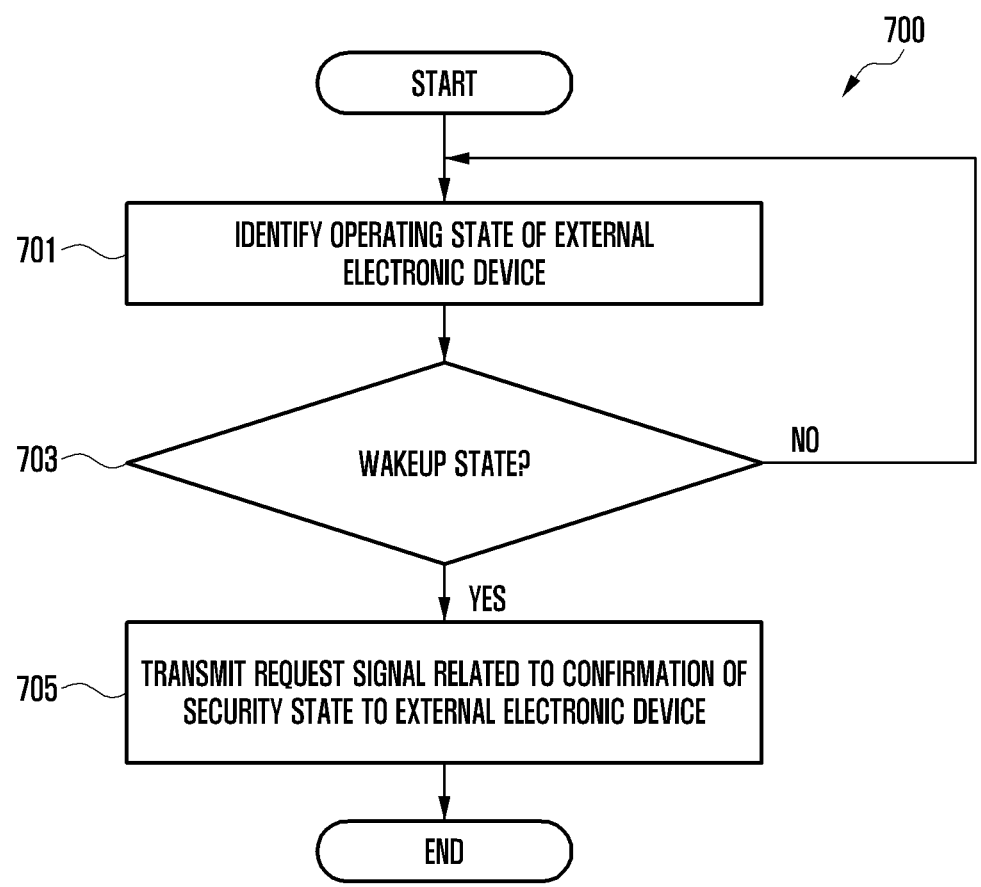
FIG. 7 is a flowchart illustrating a method for transmitting an SA query request frame in an electronic device according to various embodiments of the disclosure.

FIG. 7 is a flowchart 700 illustrating a method for transmitting an SA query request frame in an electronic device according to various embodiments of the disclosure. According to an embodiment, at least some of operations of FIG. 7 may be detailed operations of operations 505 and 507 of FIG. 5. In the following embodiment, respective operations may be sequentially performed, but are not necessarily performed sequentially. For example, the order of the respective operations may be changed, and at least two of the operations may be performed in parallel. According to an embodiment, the electronic device for performing the method of FIG. 7 may be the electronic device 101 of FIG. 1 or FIG. 2.

According to various embodiments with reference to FIG. 7, in operation 701, an electronic device (e.g., the processor 120 or the wireless communication module 192 of FIG. 1 or the processor 200 or the communication circuit 210 of FIG. 2) may identify an operating state of the external electronic device based on information related to an activation time point of the external electronic device. According to an embodiment, when receiving a management frame related to the external electronic device, the processor 200 may identify the information related to the activation time point of the external electronic device acquired through configuration of a TWT session with the external electronic device from the memory 220. For example, the processor 200 may estimate the operating state (e.g., a wakeup state or a doze state) of the external electronic device at the current time point based on the information related to the activation time point of the external electronic device.

According to various embodiments, in operation 703, the electronic device (e.g., the processor 120 or 200, the wireless communication module 192, or the communication circuit 210) may determine whether the external electronic device is in the wakeup state.

According to various embodiments, when the external electronic device is determined not to be in the wakeup state (e.g., "NO" in operation 703), the electronic device (e.g., the processor 120 or 200, the wireless communication module 192, or the communication circuit 210) may identify the operating state of the external electronic device based on the information related to the activation time point of the external electronic device in operation 701. According to an embodiment, when the external electronic device is determined to be in the doze state, the processor 200 may limit transmission of a request frame related to confirmation of a security state of the external electronic device. The processor 200 may identify whether the external electronic device is switched to the wakeup state based on the information related to the activation time point of the external electronic device.

According to various embodiments, in operation 705, when the external electronic device is determined to be in the wakeup state (e.g., "YES" in operation 703), the electronic device (e.g., the processor 120 or 200, the wireless communication module 192, or the communication circuit 210) may transmit the request frame related to the confirmation of the security state of the external electronic device to the external electronic device. For example, the request frame related to the confirmation of the security state may include the SA query request frame.

Figure 8:
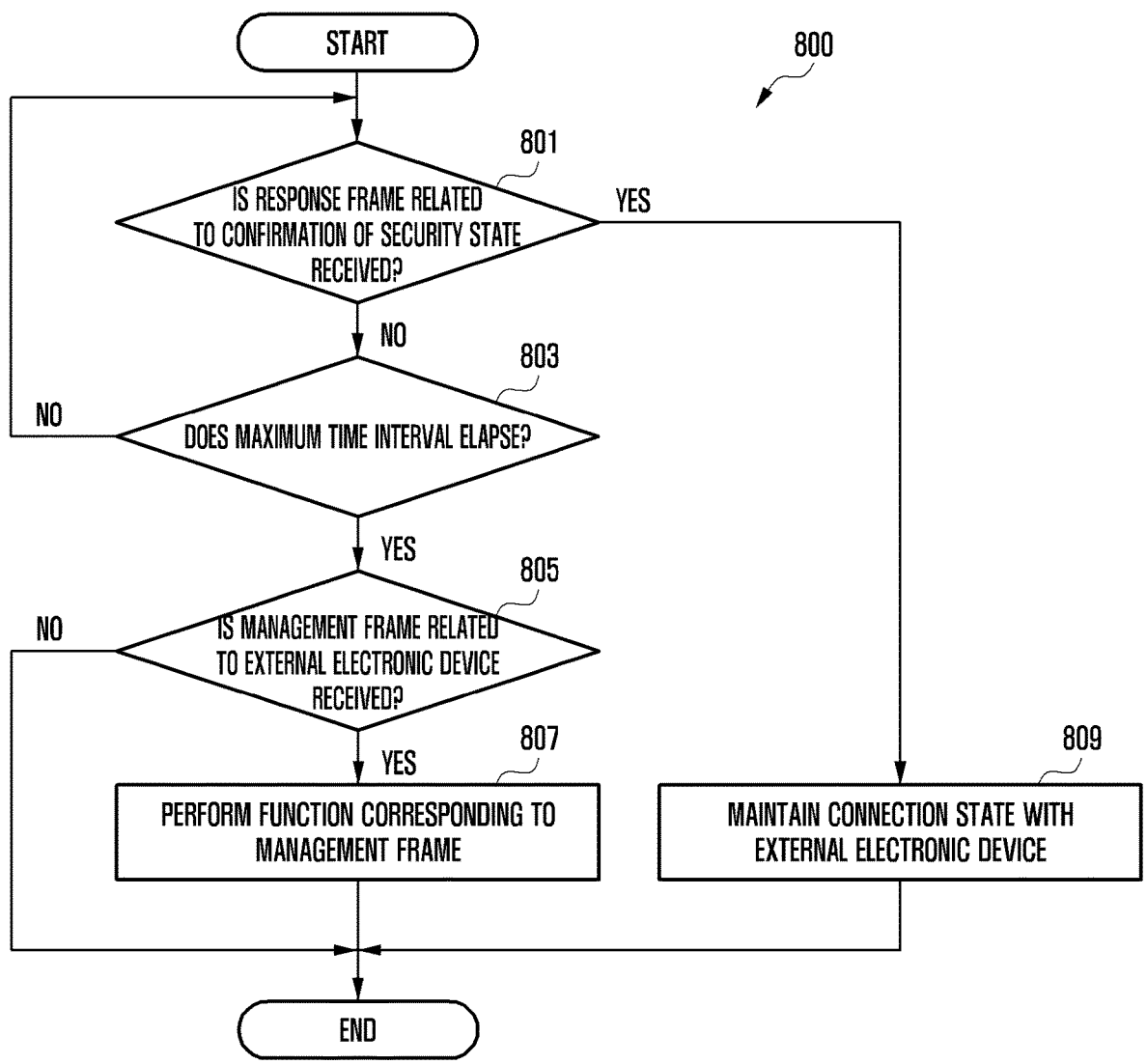
FIG. 8 illustrates an example of a flowchart illustrating a method for processing a management frame related to an external electronic device in an electronic device according to various embodiments of the disclosure.

FIG. 8 illustrates an example of a flowchart 800 illustrating a method for processing a management frame related to an external electronic device in an electronic device according to various embodiments of the disclosure. In the following embodiment, respective operations may be sequentially performed, but are not necessarily performed sequentially. For example, the order of the respective operations may be changed, and at least two operations may be performed in parallel. According to an embodiment, the electronic device for performing the method of FIG. 8 may be the electronic device 101 of FIG. 1 or 2.

According to various embodiments with reference to FIG. 8, in operation 801, when a request frame related to confirmation of a security state is transmitted (e.g., operation 507 of FIG. 5 or operation 705 of FIG. 7), an electronic device (e.g., the processor 120 or the wireless communication module 192 of FIG. 1, or the processor 200 or the communication circuit 210 of FIG. 2) may identify whether a response frame related to the confirmation of the security state is received. For example, the response frame related to the confirmation of the security state may include an SA query response frame.

According to various embodiments, in operation 803, when the response frame related to the confirmation of the security state is not received (e.g., "NO" in operation 801), the electronic device (e.g., the processor 120 or 200, the wireless communication module 192, or the communication circuit 210) may identify whether a maximum time period elapses starting from a time point when the request frame related to the confirmation of the security state has been transmitted. For example, the maximum time period may include a time period designated for identifying a security state (e.g., SA state) with the external electronic device based on the SA query.

According to various embodiments, when the maximum time period does not elapse starting from the time point when the request frame related to the confirmation of the security state has been transmitted (e.g., "NO" in operation 803), the electronic device (e.g., the processor 120 or 200, the wireless communication module 192, or the communication circuit 210) may identify whether the response frame related to the confirmation of the security state is received in operation 801. According to an embodiment, when the response frame related to the confirmation of the security state is not received, the processor 200 may control the communication circuit 210 to periodically transmit the request frame related to the confirmation of the security state for the maximum time period.

According to various embodiments, when the maximum time period elapses starting from the time point when the request frame related to the confirmation of the security state has been transmitted (e.g., "YES" in operation 803), the electronic device (e.g., the processor 120 or 200, the wireless communication module 192, or the communication circuit 210) may identify whether a management frame is received in operation 805. The management frame may be related to the external electronic device. According to an embodiment, when the management frame (e.g., an association request frame) is received (e.g., operation 503 in FIG. 5), the processor 200 may control the communication circuit 210 to transmit a response including a retransmission time point of the management frame in order to determine validity of the management frame. For example, the retransmission time point of the management frame may be configured longer than the time remains until the activation time point of the external electronic device based on the activation time point of the external electronic device. According to an embodiment, the processor 200 may identify whether the management frame related to the external electronic device is received based on the retransmission time point of the management frame through the communication circuit 210.

According to various embodiments, when the management frame related to the external electronic device is not received (e.g., "NO" in operation 805), the electronic device (e.g., the processor 120 or 200, the wireless communication module 192, or the communication circuit 210) may terminate an embodiment for processing the management frame.

According to various embodiments, in operation 807, when the management frame related to the external electronic device is received (e.g., "YES" in operation 805), the electronic device (e.g., the processor 120 or 200, the wireless communication module 192, or the communication circuit 210) may perform a function corresponding to the management frame. According to an embodiment, when the response frame related to the confirmation of the security state is not received for the maximum time period, the processor 200 may determine that the security state (e.g., SA state) with the external electronic device is invalid. For example, when the security state (e.g., SA state) with the external electronic device is determined to be invalid, the processor 200 may determine that a connection of wireless LAN communication with the external electronic device cannot be maintained. According to an embodiment, when it is determined that the connection of wireless LAN communication with the external electronic device cannot be maintained, the processor 200 may perform a series of operations for connecting the wireless LAN communication with the external electronic device based on an association request frame related to the external electronic device.

According to various embodiments, in operation 809, when the response frame related to the confirmation of the security state is received (e.g., "YES" in operation 801), the electronic device (e.g., the processor 120 or 200, the wireless communication module 192, or the communication circuit 210) may maintain a wireless LAN connection state with the external electronic device. According to an embodiment, when receiving the response frame related to the confirmation of the security state corresponding to the request frame related to the confirmation of the security state, the processor 200 may determine that the security state (e.g., SA state) with the external electronic device is valid. When it is determined that the security state with the external electronic device is valid, the processor 200 may determine that the management frame related to the external electronic device has been transmitted by an attacker. The processor 200 may discard the management frame determined to be transmitted by the attacker.

Figure 9:
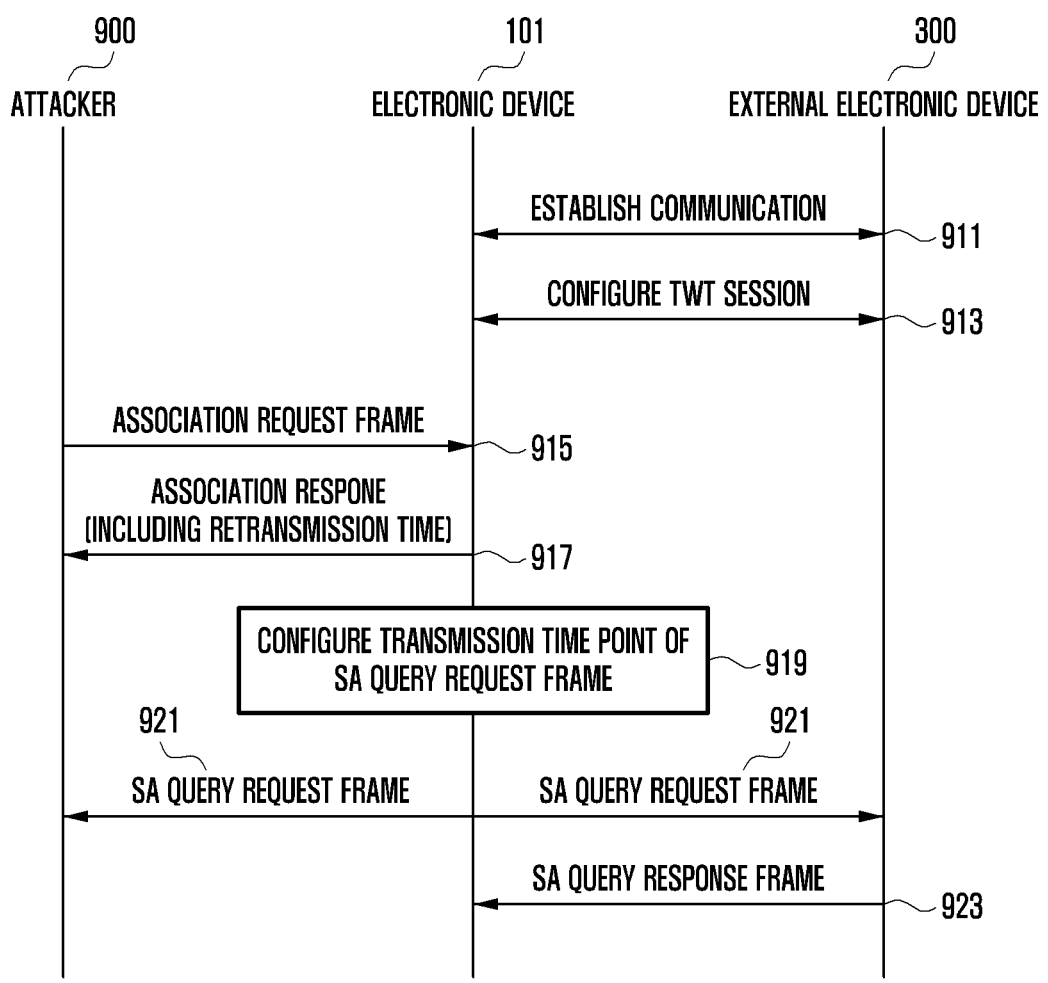
FIG. 9 illustrates an example in which an SA query is performed in an electronic device according to various embodiments of the disclosure.

FIG. 9 illustrates an example in which an SA query is performed in an electronic device according to various embodiments of the disclosure.

According to various embodiments with reference to FIG. 9, in operation 911, the electronic device 101 may establish wireless LAN communication with an external electronic device 300. According to an embodiment, the electronic device 101 may periodically transmit a beacon frame. According to an embodiment, the external electronic device 300 may be determined to be accessible to the electronic device 101 based on the beacon frame. When a connection event to the electronic device 101 occurs, the external electronic device 300 may transmit a probe request frame to the electronic device 101. For example, the connection event to the electronic device 101 may be generated based on a user input or a connection history to a wireless LAN network. According to an embodiment, the electronic device 101 may transmit a probe response frame to the external electronic device 300 based on identification information included in the probe request frame. According to an embodiment, the electronic device 101 may perform an authentication procedure with the external electronic device 300.

According to an embodiment, when the authentication procedure with the external electronic device 300 is completed, the electronic device 101 may establish wireless LAN communication with the external electronic device 300. For example, when receiving an association request frame, the electronic device 101 may transmit an association response frame to the external electronic device 300, thereby establishing a wireless LAN communication link with the external electronic device 300.

According to various embodiments, in operation 913, the electronic device 101 may configure a TWT session with the external electronic device 300. According to an embodiment, the electronic device 101 may acquire information related to an activation time point of the external electronic device 300 through an individual TWT procedure with the external electronic device 300 as shown in FIG. 3. According to an embodiment, the electronic device 101 may acquire the information related to the activation time point of the external electronic device 300 through a broadcast TWT procedure with the external electronic device 300 as shown in FIG. 4.

According to various embodiments, when receiving an association request frame related to the external electronic device 300 from an external device (e.g., an attacker 900) in operation 915, the electronic device 101 may transmit an association response to determine validity of the association request frame to the external device in operation 917. According to an embodiment, when receiving the association request frame including identification information of the external electronic device 300, the electronic device 101 may configure or obtain a retransmission time point of the association request frame based on the activation time point of the external electronic device 300. For example, the retransmission time point of the association request frame may be configured to be longer than the time remains until the activation time point of the external electronic device. According to an embodiment, the electronic device 101 may transmit an association response including the information related to the retransmission time point of the association request frame to the external device (e.g., the attacker 900). For example, the association response may include an association response frame including rejection information (e.g., status code 0x1e).

According to various embodiments, in operation 919, the electronic device 101 may configure or obtain a transmission time point of an SA query request frame with the external electronic device 300 based on the activation time point of the external electronic device 300. According to an embodiment, the electronic device 101 may identify the operating state of the external electronic device 300 based on the information related to the activation time point of the external electronic device 300. When the external electronic device 300 is determined to be in a doze state, the electronic device 101 may limit or wait transmission of the SA query request frame. When the external electronic device 300 is determined to be in a wakeup state, the electronic device 101 may determine to transmit the SA query request frame.

According to various embodiments, in operation 921, when the external electronic device 300 is determined to be in the wakeup state, the electronic device 101 may transmit the SA query request frame to the external electronic device 300. In addition, when the external electronic device 300 is determined to be in the wakeup state, the electronic device 101 may transmit the SA query request frame to the external device (e.g., the attacker 900). According to an embodiment, when the SA query response frame is not received, the electronic device 101 may periodically transmit the SA query request frame to the external electronic device 300 for a designated first time. For example, the SA query request frame may be retransmitted at a designated second time interval.

According to various embodiments, when receiving the SA query request frame, the external electronic device 300 may determine that a security state (e.g., SA state) with the electronic device 101 is valid. According to an embodiment, when the security state (e.g., SA state) with the electronic device 101 is determined to be invalid, the external electronic device 300 may limit transmission of the SA query response frame. According to an embodiment, in operation 923, when the security state (e.g., SA state) with the electronic device 101 is determined to be valid, the external electronic device 300 may transmit the SA query response frame to the electronic device 101.

According to various embodiments, when receiving the SA query response frame from the external electronic device 300 in operation 923, the electronic device 101 may determine that the security state with the external electronic device 300 is valid. According to an embodiment, when the security state with the external electronic device 300 is valid, the electronic device 101 may determine that the association request frame related to the external electronic device 300 is generated by the external attacker 900. The electronic device 101 may discard or ignore the association request frame determined to be transmitted by the external attacker 900.

According to various embodiments, when the SA query response frame is not received for the designated first time, the electronic device 101 may determine that the security state (e.g., SA state) with the external electronic device 300 is invalid. When the security state (e.g., SA state) with the external electronic device 300 is determined to be invalid, the electronic device 101 may determine that the connection of wireless LAN communication with the external electronic device 300 cannot be maintained. According to an embodiment, when it is determined that the connection of wireless LAN communication with the external electronic device 300 cannot be maintained, the electronic device 101 may perform a series of operations for association with the wireless LAN network of the external electronic device 300. For example, when receiving the association request frame related to the external electronic device 300 based on the retransmission time point, the electronic device 101 may transmit the association response frame to the external electronic device 300.

Figure 10:
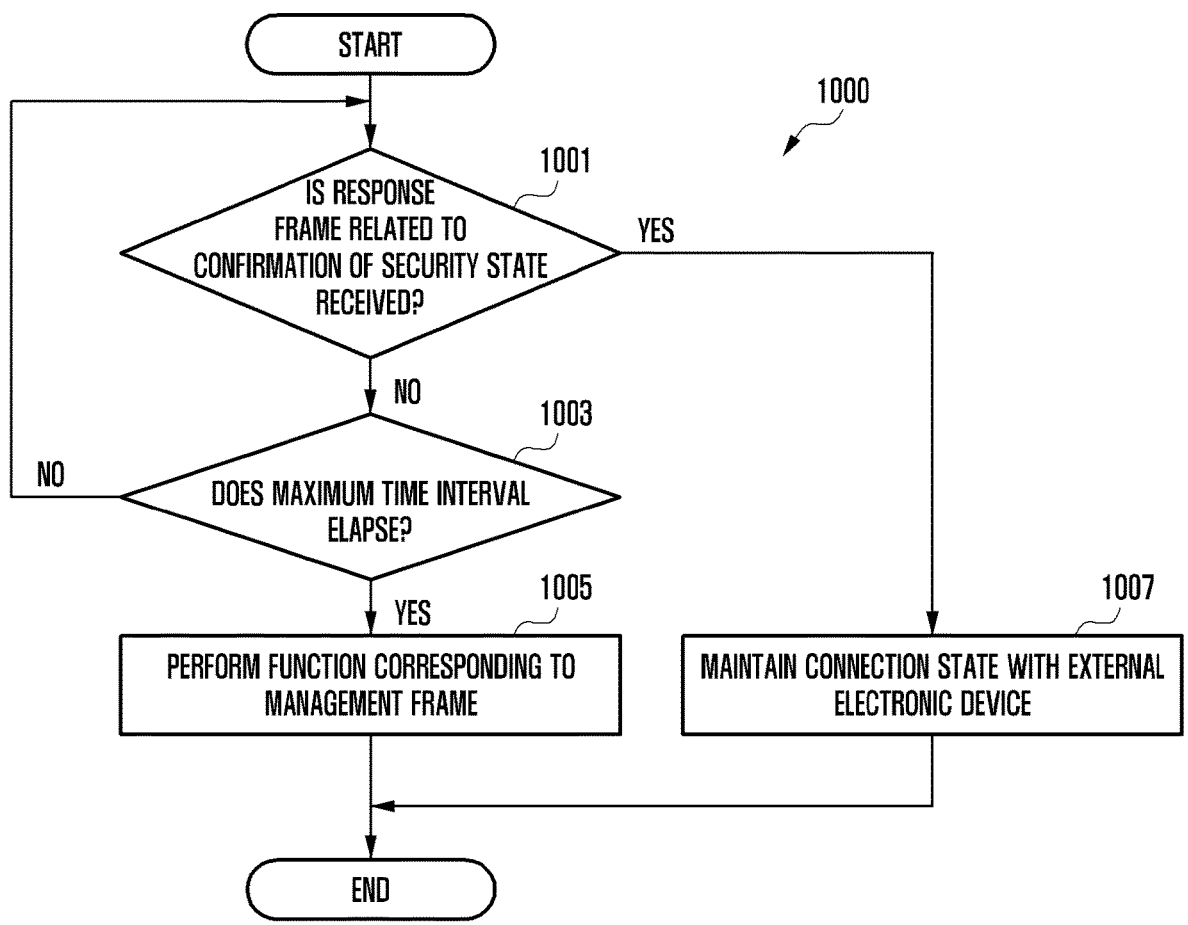
FIG. 10 illustrates another example of a flowchart illustrating a method for processing a management frame related to an external electronic device in an electronic device according to various embodiments of the disclosure.

FIG. 10 illustrates another example of a flowchart illustrating a method for processing a management frame related to an external electronic device in an electronic device according to various embodiments of the disclosure. Hereinafter, in the embodiment, respective operations may be sequentially performed, but are not necessarily performed sequentially. For example, the order of the respective operations may be changed, and at least two of the operations may be performed in parallel. According to an embodiment, the electronic device for performing the method of FIG. 10 may be the electronic device 101 of FIG. 1 or FIG. 2.

According to various embodiments with reference to FIG. 10, in operation 1001, when a request frame related to confirmation of a security state is transmitted (e.g., operation 507 of FIG. 5 or operation 705 of FIG. 7), an electronic device (e.g., the processor 120 or the wireless communication module 192 of FIG. 1, or the processor 200 or the communication circuit 210 of FIG. 2) may identify whether a response frame related to the confirmation of the security state is received. For example, the response frame related to the confirmation of the security state may include an SA query response frame.

According to various embodiments, in operation 1003, when the response frame related to the confirmation of the security state is not received (e.g., "NO" in operation 1001), the electronic device (e.g., the processor 120 or 200, the wireless communication module 192, or the communication circuit 210) may identify whether a maximum time interval elapses starting from a time point when the request frame related to the confirmation of the security state has been transmitted. For example, the maximum time interval may include a time interval designated for identifying a security state (e.g., SA state) with the external electronic device based on an SA query.

According to various embodiments, when the maximum time interval does not elapse starting from the time point when the request frame related to the confirmation of the security state has been transmitted (e.g., "NO" in operation 1003), the electronic device (e.g., the processor 120 or 200, the wireless communication module 192, or the communication circuit 210) may identify whether the response frame related to the confirmation of the security state is received in operation 1001. According to an embodiment, when the response frame related to the confirmation of the security state is not received, the processor 200 may control the communication circuit 210 to periodically transmit the request frame related to the confirmation of the security state for the maximum time interval. For example, the communication circuit 210 may periodically transmit the request frame related to the confirmation of the security state based on a designated second time.

According to various embodiments, when the maximum time interval elapses starting from the time point when the request frame related to the confirmation of the security state has been transmitted (e.g., "YES" in operation 1003), the electronic device (e.g., the processor 120 or 200, the wireless communication module 192, or the communication circuit 210) may perform a function corresponding to the management frame in operation 1005. According to an embodiment, when the response frame related to the confirmation of the security state is not received for the maximum time interval, the processor 200 may determine that the security state (e.g., the SA state) with the external electronic device is invalid. For example, when the security state (e.g., the SA state) with the external electronic device is determined to be invalid, the processor 200 may determine that a connection of wireless LAN communication with the external electronic device cannot be maintained. According to an embodiment, when it is determined that the connection of wireless LAN communication with the external electronic device cannot be maintained, the processor 200 may perform a series of operations for releasing the connection of wireless LAN communication with the external electronic device based on a disassociation frame related to the external electronic device.

According to various embodiments, in operation 1007, when the response frame related to the confirmation of the security state is received (e.g., "YES" in operation 1001), the electronic device (e.g., the processor 120 or 200, the wireless communication module 192, or the communication circuit 210) may maintain a wireless LAN connection state with the external electronic device. According to an embodiment, when the response frame related to the confirmation of the security state corresponding to the request frame related to the confirmation of the security state is received, the processor 200 may determine that the security state (e.g., SA state) with the external electronic device is valid. When the security state with the external electronic device is determined to be valid, the processor 200 may determine that the management frame related to the external electronic device has been transmitted by an attacker, thereby discarding the management frame.

Figure 11:
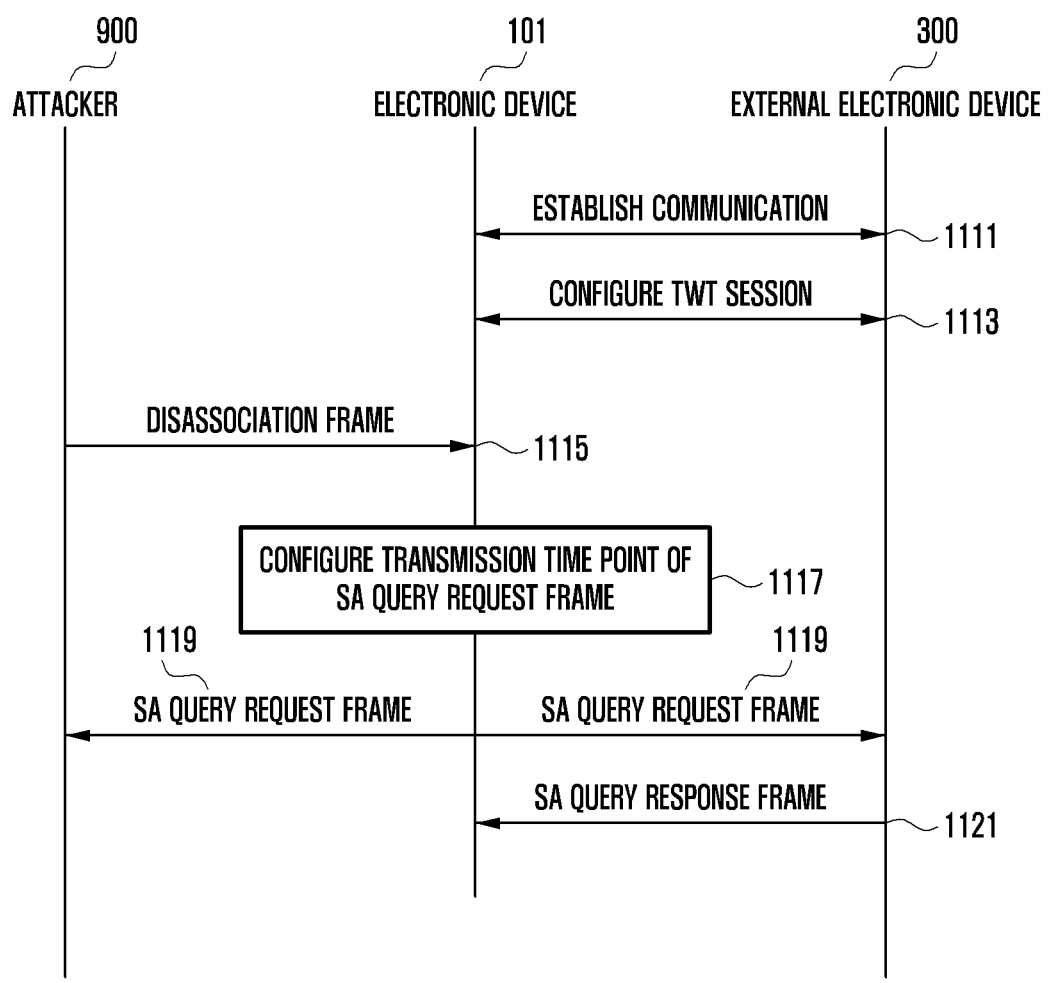
FIG. 11 illustrates another example in which an SA query is performed in an electronic device according to various embodiments.

FIG. 11 illustrates another example in which an SA query is performed in an electronic device according to various embodiments.

According to various embodiments with reference to FIG. 11, in operation 1111, the electronic device 101 may establish wireless LAN communication with the external electronic device 300. According to an embodiment, when an authentication procedure with the electronic device 101 is completed, the external electronic device 300 may transmit an association request frame to the electronic device 101. The electronic device 101 may transmit the association response frame corresponding to the association request frame to the external electronic device 300 to establish wireless LAN communication with the external electronic device 300.

According to various embodiments, in operation 1113, the electronic device 101 may configure a TWT session with the external electronic device 300. According to an embodiment, the electronic device 101 may acquire information related to an activation time point of the external electronic device 300 through an individual TWT procedure as shown in FIG. 3 or a broadcast TWT procedure as shown in FIG. 4.

According to various embodiments, when receiving a disassociation frame related to the external electronic device 300 from an external device (e.g., the attacker 900) in operation 1115, the electronic device 101 may configure or obtain a transmission time point of an SA query request frame in operation 1117. According to an embodiment, when receiving the disassociation frame including identification information of the external electronic device 300, the electronic device 101 may identify an operating state of the external electronic device 300 based on information related to the activation time point of the external electronic device 300. When the external electronic device 300 is determined to be in a doze state, the electronic device 101 may limit or wait transmission of the SA query request frame. When the external electronic device 300 is determined to be in a wakeup state, the electronic device 101 may determine to transmit the SA query request frame.

According to various embodiments, in operation 1119, when the external electronic device 300 is determined to be in the wakeup state, the electronic device 101 may transmit the SA query request frame to the external electronic device 300. In addition, when the external electronic device 300 is determined to be in the wakeup state, the electronic device 101 may transmit the SA query request frame to the external device (e.g., the attacker 900). According to an embodiment, when the SA query response frame is not received, the electronic device 101 may periodically transmit the SA query request frame to the external electronic device 300 for a designated first time. For example, the SA query request frame may be retransmitted at a designated second time interval.

According to various embodiments, when the SA query request frame is received, the external electronic device 300 may determine whether the security state (e.g., SA state) with the electronic device 101 is valid. According to an embodiment, when the security state (e.g., SA state) with the electronic device 101 is determined to be invalid, the external electronic device 300 may limit transmission of the SA query response frame. According to an embodiment, in operation 1121, when the security state (e.g., SA state) with the electronic device 101 is determined to be valid, the external electronic device 300 may transmit the SA query response frame to the electronic device 101.

According to various embodiments, when the SA query response frame is received from the external electronic device 300 in operation 1211, the electronic device 101 may determine that the security state with the external electronic device 300 is valid. According to an embodiment, when the security state with the external electronic device 300 is valid, the electronic device 101 may determine that a disassociation frame related to the external electronic device 300 is caused by an external attacker 900. The electronic device 101 may discard (or ignore) the disassociation frame determined to be transmitted by the external attacker 900.

According to various embodiments, when the SA query response frame is not received for a designated first time, the electronic device 101 may determine that the security state (e.g., SA state) with the external electronic device 300 is invalid. When the security state (e.g., SA state) with the external electronic device 300 is determined to be invalid, the electronic device 101 may determine that establishment of wireless LAN communication with the external electronic device 300 cannot be maintained. According to an embodiment, when it is determined that the establishment of wireless LAN communication with the external electronic device 300 cannot be maintained, the electronic device 101 may perform a series of operations for releasing association with the external electronic device 300 based on the disassociation frame of the external electronic device 300.

According to various embodiments of the disclosure, a method of operating an electronic device (e.g., the electronic device 101 of FIG. 1 or FIG. 2) may include establishing communication with an external electronic device based on wireless LAN communication, acquiring an activation time point of the external electronic device from the external electronic device, based on a management frame being is received, identifying an operating state of the external electronic device based on information related to the activation time point of the external electronic device, and transmitting a request frame related to confirmation of a security state with the external electronic device based on the operating state of the external electronic device.

The embodiments of the disclosure disclosed in the present specification and drawings are merely provided for specific examples in order to easily explain the technical contents of the disclosure and help the understanding of the disclosure, and are not intended to limit the scope of the disclosure. Therefore, in the scope of various embodiments of the disclosure, in addition to the embodiments disclosed herein, it should be construed that all changes or modifications derived from the technical ideas of various embodiments of the disclosure are included in the scope of various embodiments of the disclosure.

What is claimed is:

1. An electronic device comprising:
   a communication circuit configured to support a wireless local area network (LAN) communication method;
   a processor configured to be operatively connected to the communication circuit; and
   a memory configured to store instructions which, when executed by the processor, cause the electronic device to:
   establish, via the communication circuit, communication with an external electronic device,
   acquire information related to an activation time point of the external electronic device from the external electronic device,
   based on a management frame being received through the communication circuit, identify an operating state of the external electronic device based on the information related to the activation time point of the external electronic device,
   if the operating state of the external electronic device is a doze state, limit transmission of a security association (SA) query request frame, and if the operating state of the external electronic device is a wakeup state, transmit the SA query request frame to the external electronic device.

2. The electronic device of claim 1, wherein the instructions, when executed by the processor, cause the electronic device to acquire the information related to the activation time point of the external electronic device based on configuration of a target wakeup time (TWT) session.

3. The electronic device of claim 1, wherein the instructions, when executed by the processor, cause the electronic device to:
confirm identification information included in the management frame received through the communication circuit,
identify whether the management frame is related to the external electronic device based on the identification information, and
identify the operating state of the external electronic device based on the management frame being related to the external electronic device.

4. The electronic device of claim 1, wherein the management frame is an association request frame, and the instructions, when executed by the processor, cause the electronic device to:
configure time information related to retransmission of the association request frame based on the activation time point of the external electronic device, and
transmit, via the communication circuit, an association response frame including the time information related to the retransmission of the association request frame.

5. The electronic device of claim 1, wherein based on a response frame corresponding to the SA query request frame being received from the external electronic device, the instructions, when executed by the processor, cause the electronic device to discard the management frame.

6. The electronic device of claim 1, wherein based on a response frame corresponding to the SA query request frame not being received from the external electronic device, the instructions, when executed by the processor, cause the electronic device to periodically transmit the SA query request frame to the external electronic device for a designated time.

7. The electronic device of claim 6, wherein based on the response frame corresponding to the SA query request frame not being received from the external electronic device for the designated time, the instructions, when executed by the processor, cause the electronic device to perform a function corresponding to the management frame.

8. The electronic device of claim 1, wherein the instructions, when executed by the processor, cause the electronic device to obtain a transmission time point of the SA query request frame based on the information related to the activation time point of the external electronic device and transmit the SA query request frame based on the obtained transmission time point.

9. The electronic device of claim 1, wherein the management frame is a dissociation association request frame received from an external device different from the external electronic device, and
wherein based on the dissociation association request frame being received from the external device, the instructions, when executed by the processor, cause the electronic device to obtain a transmission time point of the SA query request frame based on the information related to the activation time point of the external electronic device and transmit the SA query request frame based on the obtained transmission time point.

10. A method of operating an electronic device, the method comprising:
establishing communication with an external electronic device based on wireless local area network (LAN) communication,
acquiring information related to an activation time point of the external electronic device from the external electronic device,
based on a management frame being received, identifying an operating state of the external electronic device based on information related to the activation time point of the external electronic device,
if the operating state of the external electronic device is a doze state, limiting transmission of a security association (SA) query request frame, and
if the operating state of the external electronic device is a wakeup state, transmitting the SA query request frame to the external electronic device.

11. The method of claim 10, wherein the acquiring of the information related to the activation time point of the external electronic device comprises acquiring the information related to the activation time point of the external electronic device based on configuration of a target wakeup time (TWT) session.

12. The method of claim 10, wherein the identifying of the operating state of the external electronic device comprises:
confirming identification information included in the management frame,
identifying whether the management frame is related to the external electronic device based on the identification information, and
identifying the operating state of the external electronic device based on the management frame being related to the external electronic device.

13. The method of claim 12, wherein the management frame is an association request frame received from an external device different from the external electronic device, and
wherein the method further comprises:
configuring time information related to retransmission of the association request frame based on the activation time point of the external electronic device, and
transmitting an association response frame including the time information related to the retransmission of the association request frame.

14. The method of claim 10, further comprising:
discarding, based on a response frame corresponding to the SA query request frame being received from the external electronic device, the management frame, and
periodically transmitting, based on the response frame corresponding to the SA query request frame not being received from the external electronic device, the SA query request frame to the external electronic device for a designated time.

15. The method of claim 10, further comprising, based on the response frame corresponding to the SA query request frame not being received from the external electronic device, periodically transmitting the SA query request frame to the external electronic device for a designated time.

16. The method of claim 14, further comprising:
performing, based on the response frame corresponding to the SA query request frame not being received from the external electronic device for the designated time, a function corresponding to the management frame.

17. The method of claim 10, wherein the management frame is a dissociation association request frame received from an external device different from the external electronic device,
- wherein the method further comprises, based on the dissociation association request frame being received from the external device, obtaining a transmission time point of the SA query request frame based on the information related to the activation time point of the external electronic device, and
- wherein the transmitting of the SA query request frame comprises transmitting the SA query request frame based on the obtained transmission time point.

18. A non-transitory computer-readable storage medium having recorded thereon a program for executing the method of claim 10.

* * * * *